US008634210B2

(12) United States Patent
Nagai et al.

(10) Patent No.: US 8,634,210 B2
(45) Date of Patent: Jan. 21, 2014

(54) DC-DC CONVERTER INCLUDING SWITCHING FREQUENCY CONTROL CIRCUIT

(75) Inventors: Jun Nagai, Nagaokakyo (JP); Yasuhiro Yoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 46 days.

(21) Appl. No.: 13/223,456

(22) Filed: Sep. 1, 2011

(65) Prior Publication Data

US 2012/0230062 A1 Sep. 13, 2012

(30) Foreign Application Priority Data

Sep. 3, 2010 (JP) ................................. 2010-197471

(51) Int. Cl.
*H02M 3/335* (2006.01)
*H02M 3/338* (2006.01)

(52) U.S. Cl.
USPC ..................... 363/21.01; 363/21.09; 363/21.1

(58) Field of Classification Search
USPC .......................... 363/18–21.02, 21.04, 21.06, 363/21.08–21.12, 21.14, 21.16–21.18
See application file for complete search history.

(56) References Cited

U.S. PATENT DOCUMENTS

| 5,892,665 A | 4/1999 | Matsumoto et al. |
| 6,414,861 B1 | 7/2002 | Matsumoto et al. |
| 2005/0157522 A1 | 7/2005 | Osaka |
| 2006/0214650 A1* | 9/2006 | Hirooka ........................ 323/311 |
| 2007/0291523 A1 | 12/2007 | Fukumoto et al. |
| 2009/0262562 A1 | 10/2009 | Yang |

FOREIGN PATENT DOCUMENTS

| CN | 101626197 A | 1/2010 |
| EP | 0 584 656 A1 | 3/1994 |
| JP | 06-165492 A | 6/1994 |
| JP | 07-087729 A | 3/1995 |
| JP | 09-215188 A | 8/1997 |
| JP | 10-108467 A | 4/1998 |
| JP | 10-229674 A | 8/1998 |
| JP | 11-069799 A | 3/1999 |
| JP | 2001-169545 A | 6/2001 |
| JP | 2005-210759 A | 8/2005 |
| JP | 2006-006057 A | 1/2006 |
| JP | 2006-034071 A | 2/2006 |
| JP | 2006-141160 A | 6/2006 |

OTHER PUBLICATIONS

Official Communication issued in corresponding Japanese Patent Application No. 2010-197471, mailed on Oct. 16, 2012.

* cited by examiner

*Primary Examiner* — Adolf Berhane
*Assistant Examiner* — Nusrat Quddus
(74) *Attorney, Agent, or Firm* — Keating & Bennett, LLP

(57) ABSTRACT

A DC-DC converter includes a series circuit including a primary transformer coil and a main switch element connected between a power input terminal and a ground terminal. A secondary transformer coil is connected to a rectifying/smoothing circuit including rectification-side and commutation-side synchronous rectifiers, a smoothing capacitor, and a choke coil. The output voltage from the rectifying/smoothing circuit is supplied to a load connected to a power output terminal. An input voltage detection circuit detects the voltage between the power input terminal and the ground terminal, and supplies a detection signal to a VIN terminal of a switching control circuit. The switching control circuit performs PWM control to maintain a constant output voltage output to the load, reduces the switching frequency when the input voltage input to the VIN terminal is low, and increases the switching frequency in accordance with an increase in the input voltage.

3 Claims, 8 Drawing Sheets

DC-DC CONVERTER INCLUDING SWITCHING FREQUENCY CONTROL CIRCUIT

BACKGROUND OF THE INVENTION

1. Field of the Invention

The present invention relates to a DC-DC converter which performs PWM (Pulse Width Modulation) control on a main switch element, particularly to a DC-DC converter which reduces switching loss.

2. Description of the Related Art

Japanese Unexamined Patent Application Publication No. 2001-169545 discloses a DC-DC converter used as a DC stabilized power supply circuit. FIG. 1 is a circuit diagram of the DC-DC converter described in Japanese Unexamined Patent Application Publication No. 2001-169545. A primary coil 3 of a transformer 2 is connected to a main switch element 5. A secondary coil 7 of the transformer 2 is connected to a rectifying and smoothing circuit 40 including a rectification-side synchronous rectifier 8, an inverter 9, a commutation-side synchronous rectifier 10, a smoothing capacitor 12, and a choke coil 13. The rectifying and smoothing circuit 40 is connected to a load 15.

A tertiary coil 18 of the transformer 2 is connected to an output voltage detection circuit 41 which detects an output voltage Vout by using diodes 21 and 19, a capacitor 20, a choke coil 22, and resistors 23 and 24.

A divided voltage output from the resistors 23 and 24 is connected to a control circuit 42 including an operational amplifier 25, a reference power supply 26, a comparator 27, a resistor 28, a capacitor 29, and a triangular wave oscillator 30.

In the DC-DC converter, the switching frequency is set by the triangular wave oscillator 30, and the PWM control is performed on the basis of feedback signals. A resonance voltage is generated in the OFF period of the main switch element 5, and resonant reset is performed in the OFF period. The switching frequency is fixed. If a primary-side input voltage varies, the ON duty ratio is changed by the PWM control to maintain a constant output voltage. When the turn ratio of the primary and secondary coils is represented by N, a relationship Vout/Vin=N×Ton/T is established among the input voltage Vin, the output voltage Vout, the period T, and the ON time Ton. If the switching frequency is fixed, therefore, the period T is fixed, and the output voltage Vout is controlled by the ON time Ton. Herein, the ON duty ratio is defined as Ton/T.

FIGS. 2A and 2B are waveform charts of a gate voltage Vg and a drain-source voltage Vds of the main switch element 5 illustrated in FIG. 1. With reference to FIGS. 2A and 2B, description will be made of issues and problems with a PWM-controlled forward converter as described in Japanese Unexamined Patent Application Publication No. 2001-169545.

First, if the input voltage is low, the ON duty ratio of the PWM is increased, as illustrated in FIG. 2A. That is, the ON time of the main switch element 5 is increased, and the OFF time thereof is reduced. With the reduction of the OFF time, the main switch element 5 is turned on before the completion of resonant reset (reset of the excitation of a transformer caused by the flow of resonance current after the turn-off of a main switch element). Therefore, switching is performed with a high value of the drain-source voltage Vds of the main switch element 5 (voltage Vs1 in FIG. 2A), and a switching loss occurs.

At the time of resonant reset, a voltage combining the input voltage and the resonance voltage (voltage Vp1 in FIG. 2B) is applied between the drain and source of the main switch element 5. If the input voltage is high, therefore, the peak value of the voltage generated by the resonant reset is increased. Accordingly, a high voltage resistant switch element is required. In general, a high voltage resistant switch element has a high Rdson (ON resistance). Therefore, the switching loss is increased.

As described above, the related art DC-DC converter which performs PWM control on a main switch element has a problem in that the switching loss occurs at both a high input voltage and a low input voltage.

SUMMARY OF THE INVENTION

Preferred embodiments of the present invention provide a DC-DC converter which reduces the switching loss caused by an increase or reduction in the input voltage.

A DC-DC converter according to a preferred embodiment of the present invention includes a transformer including a primary coil to which an input voltage is input and a secondary coil which outputs an output voltage, a main switch element connected in series to the primary coil, a switching control circuit configured to perform PWM control of the ON-OFF operation of the main switch element, and a rectifying and smoothing circuit connected to the secondary coil. The DC-DC converter further includes an input voltage detection circuit configured to detect the input voltage. The switching control circuit includes a switching frequency control circuit configured to control the switching frequency of the main switch element to be reduced in accordance with a reduction in the input voltage and to be increased in accordance with an increase in the input voltage.

In a second preferred embodiment of the DC-DC converter according to the present invention, the switching frequency control circuit includes a triangular wave oscillation circuit configured to generate a triangular wave of a frequency varying in accordance with the value of current flowing through a resistance circuit, and a circuit configured to determine the value of current flowing through the resistance circuit in accordance with the input voltage.

In a third preferred embodiment of the DC-DC converter according to the present invention, the transformer includes a tertiary coil, and the input voltage detection circuit includes a rectifying and smoothing circuit connected to the tertiary coil and including a choke coil, and a peak charging circuit configured to detect the peak value of the voltage between opposite ends of the choke coil.

According to various preferred embodiments of the present invention, it is possible to perform switching of the main switch element with a switching frequency suitable for the input voltage, and consequently to prevent and minimize the switching loss.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
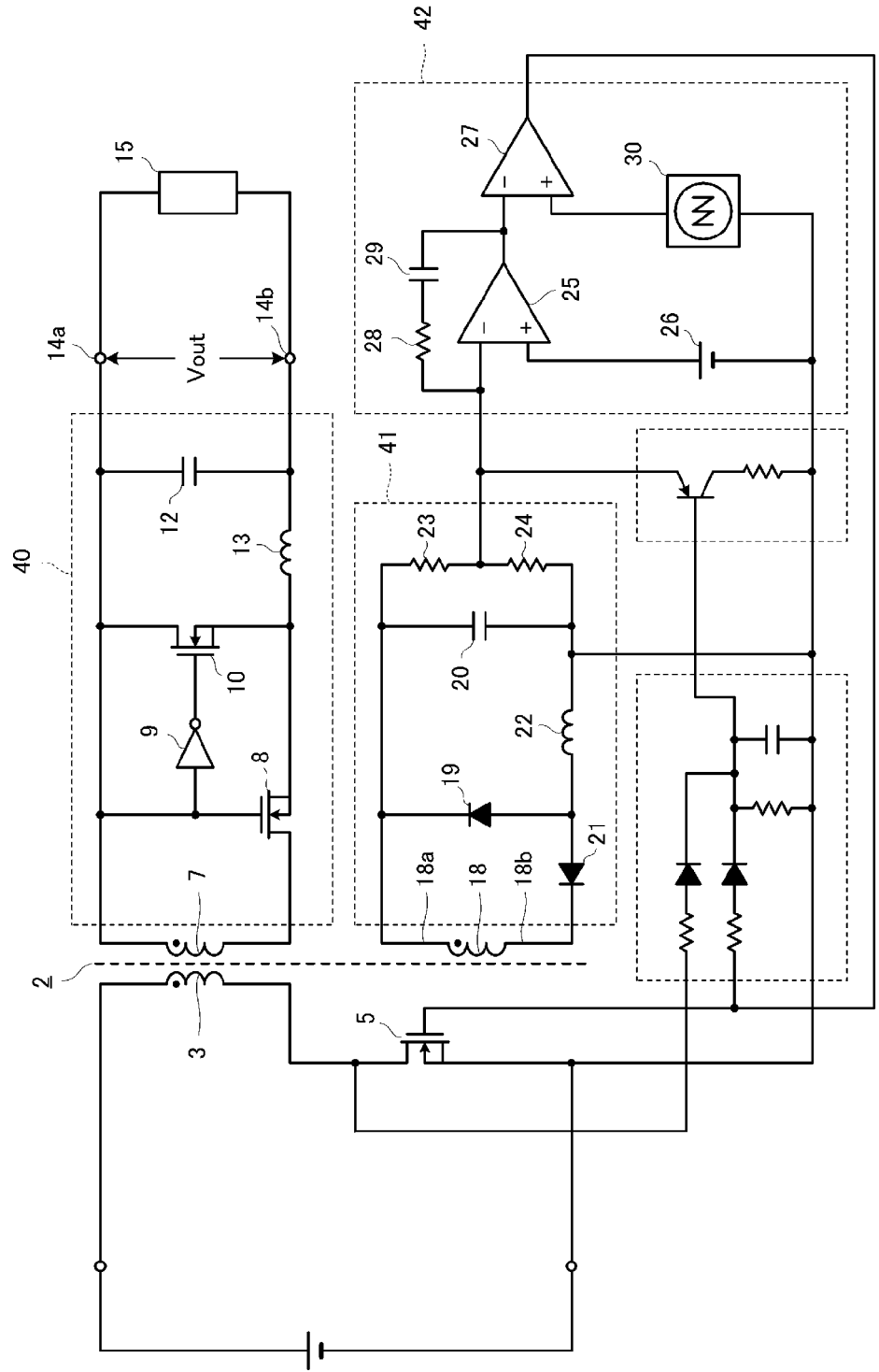
FIG. 1 is a circuit diagram of a DC-DC converter described according to a related art.
Figure 2A:
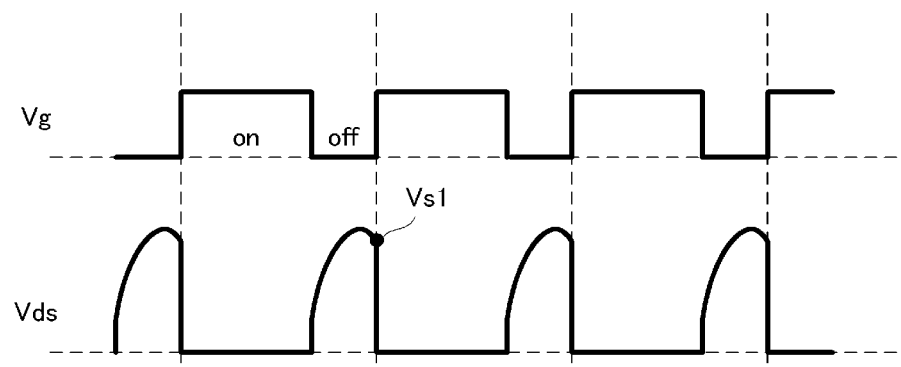
FIGS. 2A and 2B are waveform charts of the gate voltage and the drain-source voltage of a main switch element illustrated in FIG. 1.
Figure 2B:
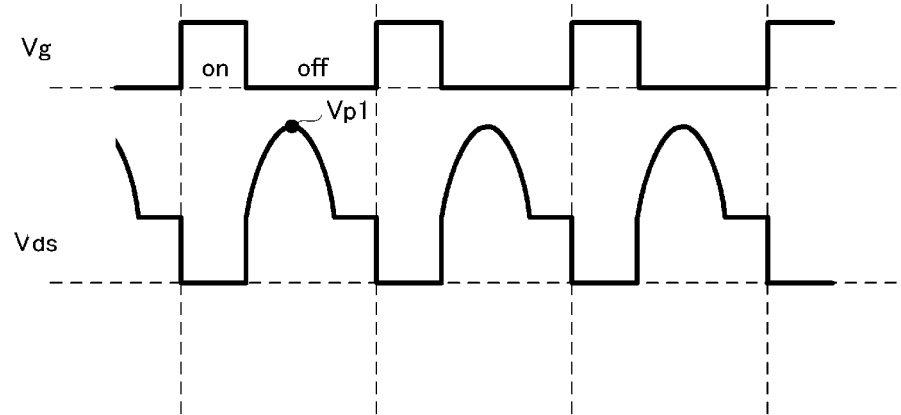
Figure 3:
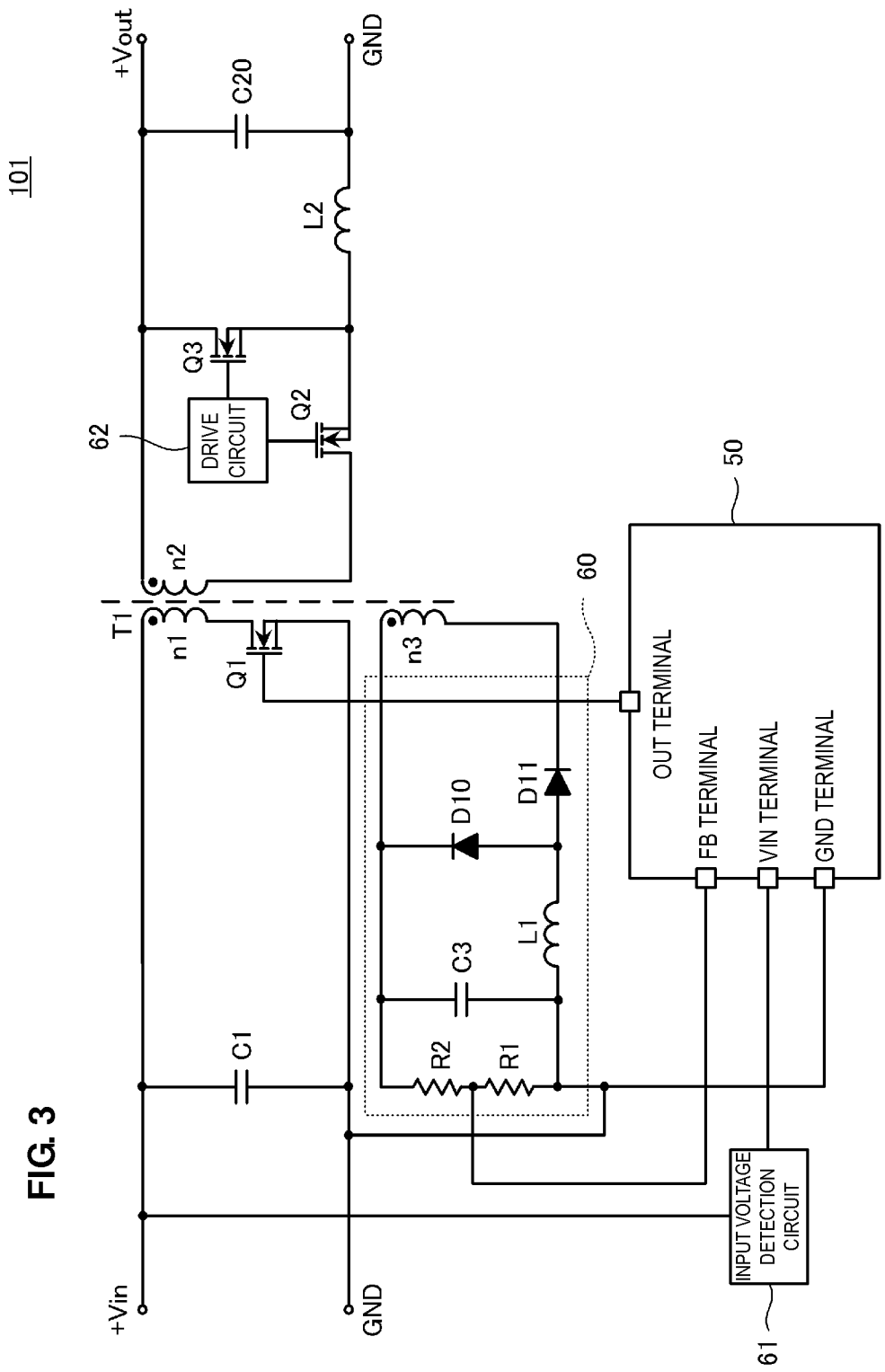
FIG. 3 is a circuit diagram of a DC-DC converter according to a first preferred embodiment of the present invention.

A first preferred embodiment will be described with reference to FIGS. 3 to 5B. FIG. 3 is a circuit diagram of a DC-DC converter 101 according to the first preferred embodiment of the present invention.

The DC-DC converter 101 includes a transformer T1, and a primary coil n1 thereof is connected in series to a main switch element Q1. A series circuit including the transformer T1 and the main switch element Q1 is connected between a power supply input terminal +Vin and a GND terminal.

A secondary coil n2 of the transformer T1 is connected to a rectifying and smoothing circuit including a rectification-side synchronous rectifier Q2, a commutation-side synchronous rectifier Q3, a smoothing capacitor C20, and a choke coil L2. The output voltage from the rectifying and smoothing circuit is supplied to a load connected to a power supply output terminal +Vout. A drive circuit 62 controls the rectification-side synchronous rectifier Q2 and the commutation-side synchronous rectifier Q3 on the basis of, for example, the voltage of the secondary coil n2 of the transformer T1.

A tertiary coil n3 of the transformer T1 is connected to an output voltage detection circuit 60. The output voltage detection circuit 60 includes diodes D10 and D11, a capacitor C3, a choke coil L1, and resistors R1 and R2. The output voltage detection circuit 60 generates a detection signal of the output voltage output to the load (proportional voltage signal of the output voltage). The detection signal is supplied to an FB terminal of a switching control circuit 50.

An input voltage detection circuit 61 detects the voltage between the power supply input terminal +Vin and the GND terminal, and supplies a detection signal of the voltage to a VIN terminal of the switching control circuit 50.

The switching control circuit 50 outputs a switching control signal from an OUT terminal thereof to the gate of the main switch element Q1.

Figure 4:
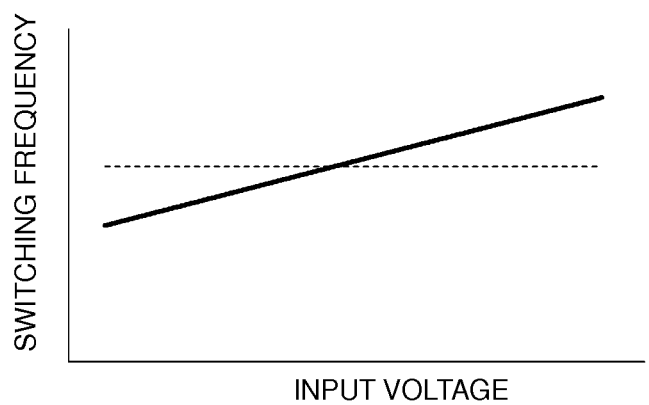
FIG. 4 is a diagram illustrating the relationship between the input voltage input to a VIN terminal of a switching control circuit and the switching frequency.

FIG. 4 is a diagram illustrating the relationship between the input voltage input to the VIN terminal of the switching control circuit 50 and the switching frequency. The lower voltage is the input voltage input between the power supply input terminal +Vin and the GND terminal of the DC-DC converter 101, i.e., the lower voltage is the input voltage input to the VIN terminal of the switching control circuit 50, the relatively lower voltage is the switching frequency. Conversely, the higher is the input voltage, the relatively higher voltage is the switching frequency.

Figure 5A:
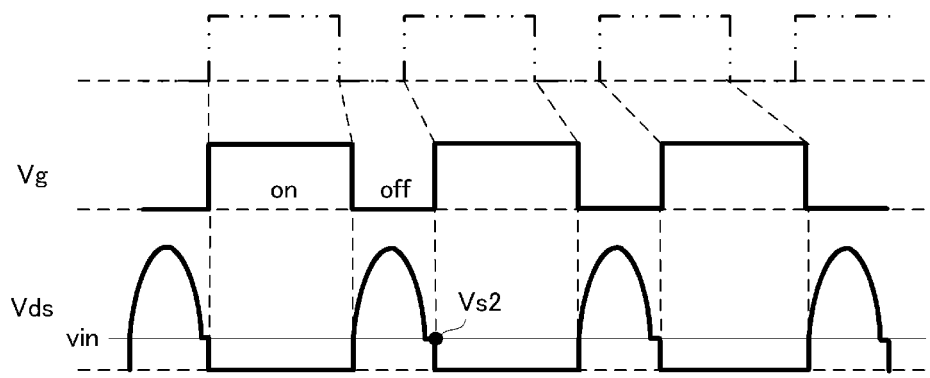
FIGS. 5A and 5B are waveform charts of the gate voltage and the drain-source voltage of a main switch element illustrated in FIG. 3.
Figure 5B:
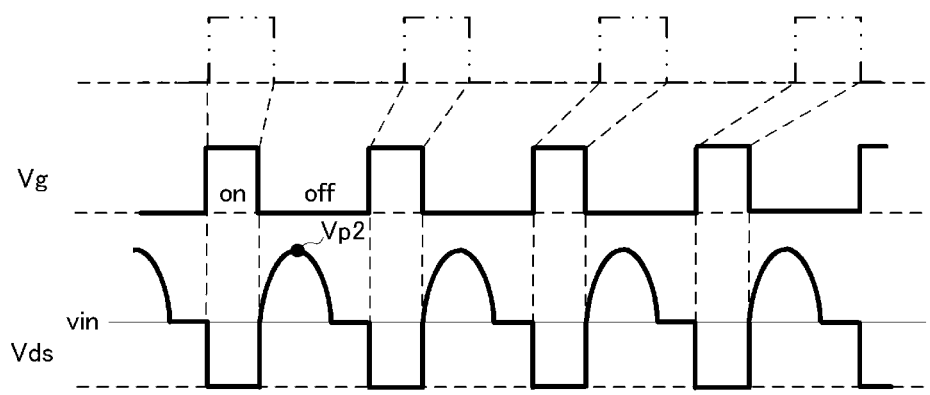

FIGS. 5A and 5B are waveform charts of a gate voltage Vg and a drain-source voltage Vds of the main switch element Q1 illustrated in FIG. 3. FIG. 5A illustrates waveforms at a low input voltage, and FIG. 5B illustrates waveforms at a high input voltage. A dash-double dot line in each of FIGS. 5A and 5B indicates a gate voltage waveform obtained with an intermediate, average, and fixed switching frequency, which does not vary.

A reduction in the input voltage results in an increase in the ON duty ratio of the main switch element Q1, and an increase in the input voltage results in a reduction in the ON duty ratio. As indicated by the dash-double dot line in FIG. 5A, a reduction in the input voltage results in an increase in the ON duty ratio, i.e., an increase in the ON time of the main switch element Q1. In the present preferred embodiment, however, the switching frequency is reduced at the same time. As indicated by the gate voltage Vg in FIG. 5A, therefore, the OFF time of the main switch element Q1 is increased, and the resonant reset is completed in the OFF time. If the main switch element Q1 is turned off, resonance current flows through a resonant circuit formed by, for example, the primary coil n1 of the transformer T1 and the drain-source capacitance of the main switch element Q1, and the waveform of the drain-source voltage Vds corresponds to half the cycle of a sine wave.

In the example illustrated in FIG. 5A, the main switch element Q1 is turned on with the drain-source voltage Vds thereof corresponding to the input voltage Vin (voltage Vs2 in FIG. 5A), i.e., with a low value of the drain-source voltage Vds. Accordingly, the switching loss is reduced.

Meanwhile, as indicated by the dash-double dot line in FIG. 5B, an increase in the input voltage results in a reduction in the ON duty ratio. In the present preferred embodiment, however, the switching frequency is increased at the same time. As indicated by the gate voltage Vg in FIG. 5B, therefore, the ON time of the main switch element Q1 is further reduced. Consequently, there is a reduction in the energy excited in the primary coil n1 of the transformer T1 in the ON time of the main switch element Q1, and a peak voltage Vp2 in the resonant reset is reduced. It is therefore possible to use a low voltage resistant switch element having a low Rdson (ON resistance). Accordingly, the switching loss is greatly reduced.

Second Preferred Embodiment

Figure 6:
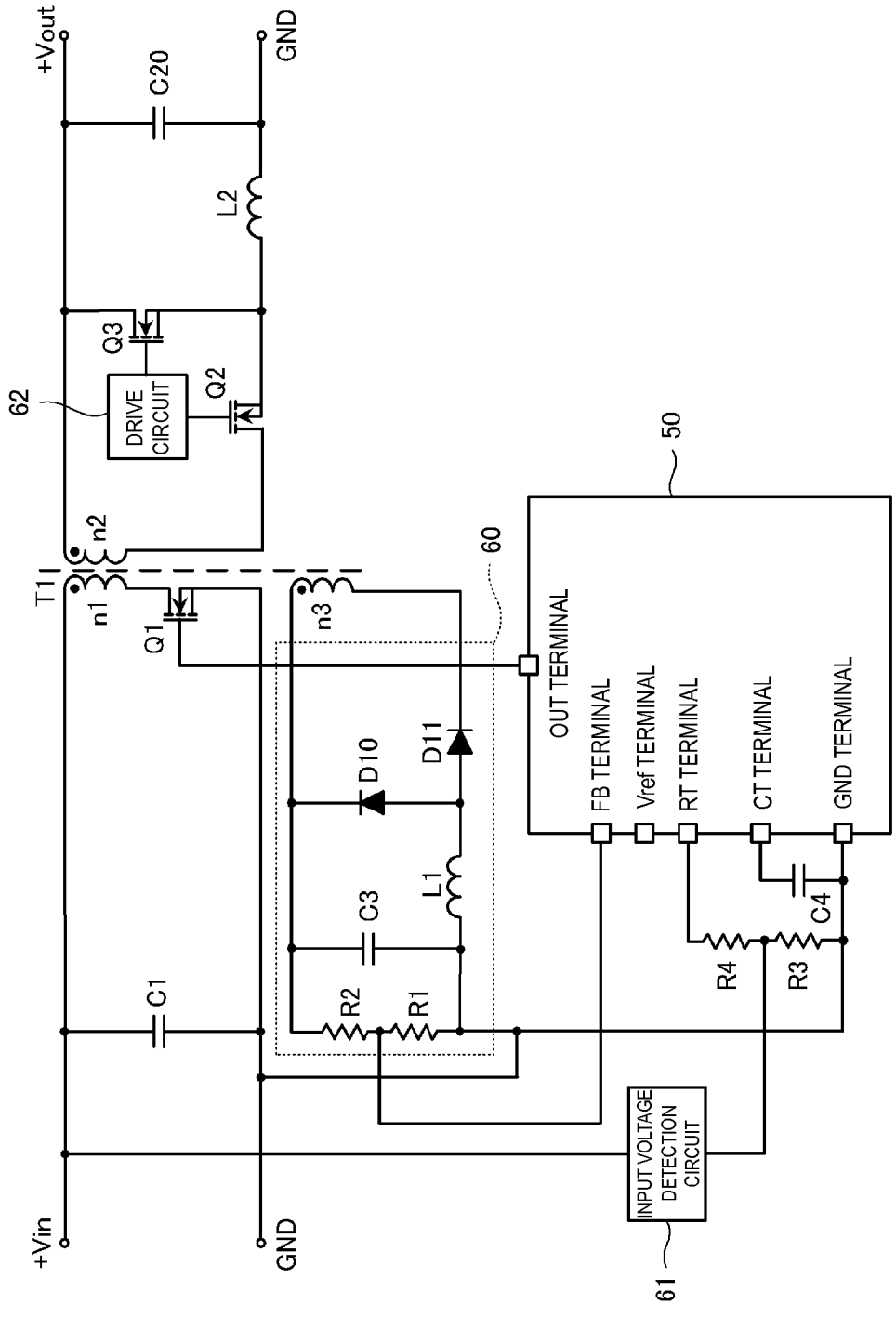
FIG. 6 is a circuit diagram of a DC-DC converter according to a second preferred embodiment of the present invention.

In a second preferred embodiment, description will be made of another example of the switching control circuit which changes the switching frequency in accordance with the input voltage. FIG. 6 is a circuit diagram of a DC-DC converter 102 according to the second preferred embodiment of the present invention.

In FIG. 6, the switching control circuit 50 is a switching control IC (Integrated Circuit), and a series circuit formed by resistors R3 and R4 is connected between an RT terminal and a GND terminal of the switching control circuit 50. Further, a capacitor C4 is connected between a CT terminal and the GND terminal. The output terminal of the input voltage detection circuit 61 is connected to a connection point of the resistors R3 and R4. The other configurations are preferably similar to those of the first preferred embodiment.

Figure 7:
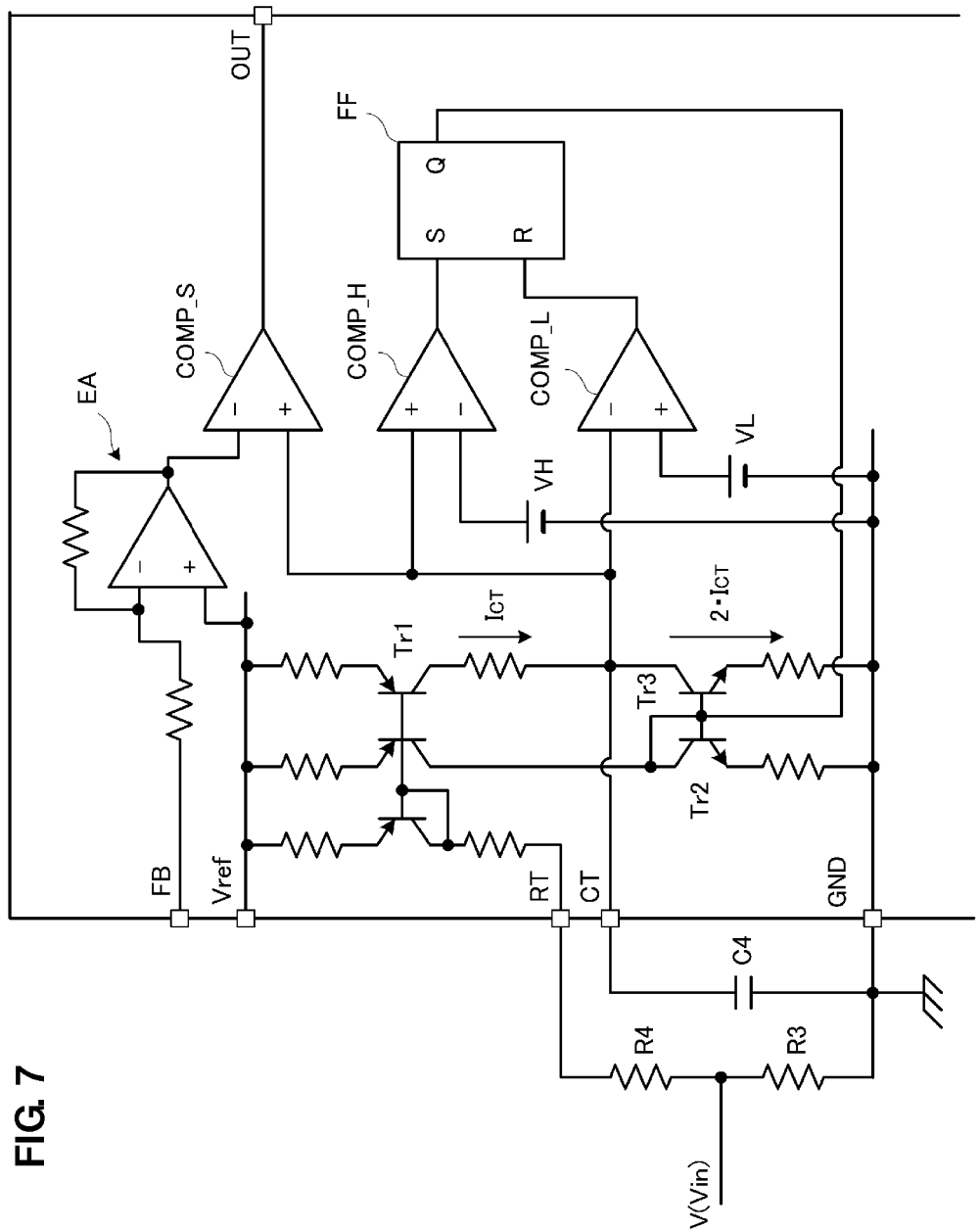
FIG. 7 is a circuit diagram of a main portion of a switching control circuit.

FIG. 7 is a circuit diagram of a main portion of the switching control circuit 50. The circuit operates as follows.

A reference voltage terminal Vref is applied with a reference voltage. Therefore, the current according to the series resistance value of the resistors R3 and R4 connected to the RT terminal and the voltage of an input voltage detection signal V(Vin) flows from the RT terminal. When the current flowing between an emitter and a collector of a transistor Tr1 is represented by ICT, the current ICT is determined by the current flowing from the RT terminal. The current flowing through a transistor Tr3 is set to be 2×ICT. A flip-flop FF outputs an "L" level Q output upon activation thereof. Thus, a transistor Tr2 is in the OFF state, and the capacitor C4 is charged by the current ICT. Therefore, the charge time in this case is determined by the series resistance value of the resistors R3 and R4, the capacitance of the capacitor C4, and the voltage of the input voltage detection signal V(Vin).

The input voltage detection signal V(Vin) is output from the input voltage detection circuit 61 illustrated in FIG. 6, in which the relationship between the input voltage and the output voltage is represented by a negative coefficient. That is, the input voltage and the output voltage are related such that the higher is the input voltage Vin, the lower is the voltage of the input voltage detection signal V(Vin).

The higher is the input voltage Vin, the lower is the voltage of the input voltage detection signal V(Vin). Therefore, the higher is the input voltage Vin, the shorter is the charge time.

If the voltage of the capacitor C4 reaches a higher voltage threshold value VH, the output of a comparator COMP_H is inversed, and the flip-flop FF is set. Further, the transistor Tr2 is turned on by the Q output from the flip-flop FF. In this state, due to the charging current set to 2×ICT, the current flowing through the capacitor C4 is represented as ICT−2×ICT=−ICT, and the capacitor C4 is discharged by the current ICT. Therefore, the discharge time in this case is determined by the series resistance value of the resistors R3 and R4, the capacitance of the capacitor C4, and the voltage of the input voltage detection signal V(Vin).

The higher the input voltage Vin is, the lower the voltage of the input voltage detection signal V(Vin) is. Therefore, the higher the input voltage Vin is, the shorter the discharge time is.

If the voltage of the CT terminal is reduced to a lower voltage threshold value VL, the output of a comparator COMP_L is inversed, and the flip-flop FF is reset. Further, the transistor Tr2 is turned off by the Q output from the flip-flop FF. Therefore, the capacitor C4 is recharged.

With the above-described operations being repeatedly performed, a voltage signal having a symmetrical triangular wave is generated at the CT terminal with an amplitude between the voltage threshold values VL and VH.

An increase in the voltage of the input voltage detection signal V(Vin) results in an increase in the charging or discharging current to the capacitor C4 (=ICT) and an increase in the frequency of the triangular wave.

An error amplifier EA inverts and amplifies an error voltage of the input voltage at the FB terminal relative to the reference voltage. Therefore, the output voltage from the error amplifier EA is increased in accordance with a reduction in the output voltage from the DC-DC converter 102 below the target value.

The above-described voltage signal having the triangular wave is input to a non-inverting input terminal of a comparator COMP_S, and the output voltage from the error amplifier EA is input to an inverting input terminal of the comparator COMP_S. Then, the output voltage from the comparator COMP_S is output from the OUT terminal. Therefore, the main switch element Q1 illustrated in FIG. 6 is PWM-controlled.

In the above-described manner, the output voltage of the DC-DC converter 102 is stabilized, and the switching of the main switch element Q1 is performed with the switching frequency determined in accordance with the input voltage of the DC-DC converter 102.

Third Preferred Embodiment

Figure 8:
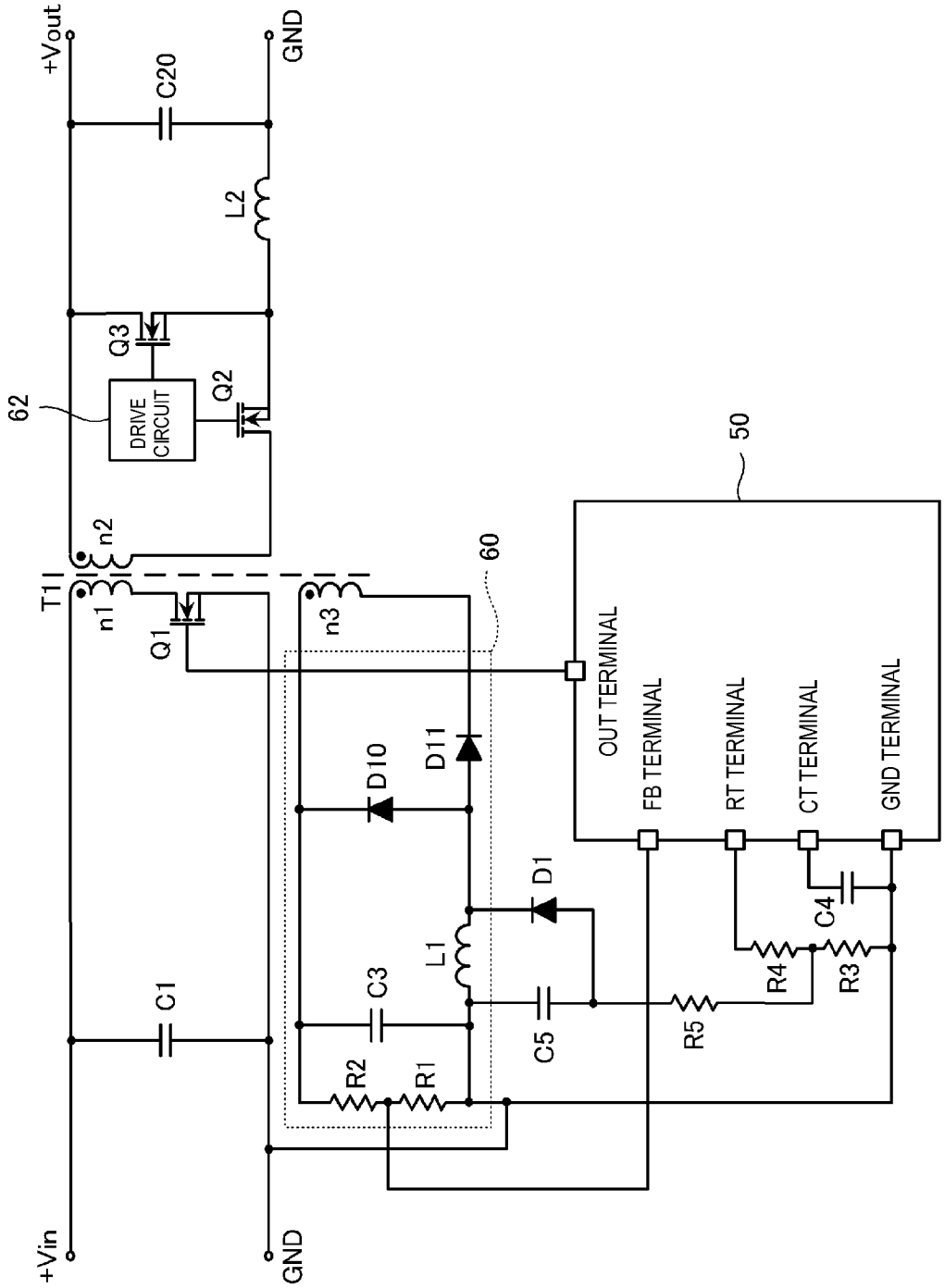
FIG. 8 is a circuit diagram of a DC-DC converter according to a third preferred embodiment of the present invention.

In a third preferred embodiment, description will be made of another example of the detection circuit which detects the input voltage input to a DC-DC converter. FIG. 8 is a circuit diagram of a DC-DC converter 103 according to the third preferred embodiment. The DC-DC converter 103 is different from the second preferred embodiment in a circuit provided between the output voltage detection circuit 60 connected to the tertiary coil n3 of the transformer T1 and the RT terminal of the switching control circuit 50.

Opposite ends of the choke coil L1 of the output voltage detection circuit 60 are connected to a peak charging circuit including a diode D1 and a capacitor C5. Further, a resistor R5 is connected between the capacitor C5 and the resistors R3 and R4 to apply the voltage of the capacitor C5 to the connection point of the resistors R3 and R4. The other configurations are preferably similar to those of the second preferred embodiment.

The peak charging circuit including the diode D1 and the capacitor C5 supplies the peak voltage of the voltage between the opposite ends of the choke coil L1 (negative voltage) to the connection point of the resistors R3 and R4 via the resistor R5.

The peak value of the voltage between the opposite ends of the choke coil L1 is proportional to the input voltage Vin. If the turn ratio of the primary coil n1 and the secondary coil n2 of the transformer T1 is represented as N3/N1, therefore, a voltage represented as Vin×N3/N1 is applied to the capacitor C5.

The input voltage detection circuit may be configured in the above-described manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter comprising:
   a transformer including a primary coil to which an input voltage is input and a secondary coil which outputs an output voltage;
   a main switch element connected in series to the primary coil;
   a switching control circuit configured to perform pulse width modulation control of the ON-OFF operation of the main switch element;
   a rectifying and smoothing circuit connected to the secondary coil; and
   an input voltage detection circuit configured to detect the input voltage; and
   the switching control circuit includes a switching frequency control circuit configured to control the switching frequency of the main switch element such that the switching frequency is reduced in accordance with a reduction in the input voltage and the switching frequency is increased in accordance with an increase in the input voltage.

2. The DC-DC converter according to claim 1, wherein the switching frequency control circuit includes a triangular wave oscillation circuit configured to generate a triangular wave of a frequency varying in accordance with a value of current flowing through a resistance circuit, and a circuit configured to determine the value of current flowing through the resistance circuit in accordance with the input voltage.

3. The DC-DC converter according to claim 1, wherein the transformer includes a tertiary coil, and
   the input voltage detection circuit includes a rectifying and smoothing circuit connected to the tertiary coil and including a choke coil, and a peak charging circuit configured to detect the peak value of the voltage between opposite ends of the choke coil.

\* \* \* \* \*